United States Patent [19]

Bedenbender et al.

[11] Patent Number: 4,519,053
[45] Date of Patent: May 21, 1985

[54] FORCE OR PRESSURE FEEDBACK CONTROL FOR SEISMIC VIBRATORS

[75] Inventors: John W. Bedenbender, Ponca City, Okla.; Gilbert H. Kelly, deceased, late of Irving, Tex.

[73] Assignee: Texas Instruments Incorporated, Dallas, Tex.

[21] Appl. No.: 655,999

[22] Filed: Oct. 1, 1984

Related U.S. Application Data

[63] Continuation of Ser. No. 325,618, Nov. 27, 1981, abandoned, which is a continuation of Ser. No. 870,236, Jan. 17, 1978, abandoned, which is a continuation of Ser. No. 673,854, Apr. 5, 1976, abandoned, which is a continuation of Ser. No. 427,899, Dec. 26, 1973, abandoned.

[51] Int. Cl.³ ............................................. G01V 1/14
[52] U.S. Cl. ................................ 367/190; 181/119; 181/401
[58] Field of Search ............... 367/190; 181/106, 113, 181/114, 119, 120, 121, 401; 73/663, 665

[56] References Cited

U.S. PATENT DOCUMENTS

| | | |
|---|---|---|
| 3,208,550 | 9/1965 | Castavet et al. .................. 181/119 |
| 3,216,525 | 11/1965 | Fail et al. ........................ 181/113 |
| 3,363,720 | 1/1968 | Mifsud ............................. 181/121 |
| 3,578,102 | 5/1971 | Ross et al. ....................... 181/401 |
| 3,761,874 | 9/1973 | Landrum .......................... 367/190 |
| 3,795,286 | 3/1974 | Meyer .............................. 367/190 |
| 3,840,090 | 10/1974 | Silverman ........................ 181/119 |
| 3,858,170 | 12/1974 | Freeman et al. ................. 367/190 |
| 4,049,077 | 9/1977 | Mifsud ............................. 181/114 |
| 4,063,613 | 12/1977 | Silverman ........................ 367/190 |
| 4,064,481 | 12/1977 | Silverman ........................ 367/190 |
| 4,184,144 | 1/1980 | Ridenbacher .................... 181/121 |

FOREIGN PATENT DOCUMENTS 2850032 11/1978 Fed. Rep. of Germany ...... 367/190
1071900 6/1967 United Kingdom ............... 367/190

Primary Examiner—Nelson Moskowitz
Attorney, Agent, or Firm—Thomas G. Devine; Leo N. Heiting; Melvin Sharp

[57] ABSTRACT

A seismic vibrator source having an hydraulic vibrator coupled to vibrate a ground pad is provided with one or more force transducers such as, for example, load cells, strain gauges, or piezoelectric elements for measuring the force applied to the earth. Signals indicative of the pressure force are applied to a controller for the hydraulic vibrator to adjust control signals to prevent decoupling of the ground pad from the earth during ground seismic operations.

4 Claims, 11 Drawing Figures

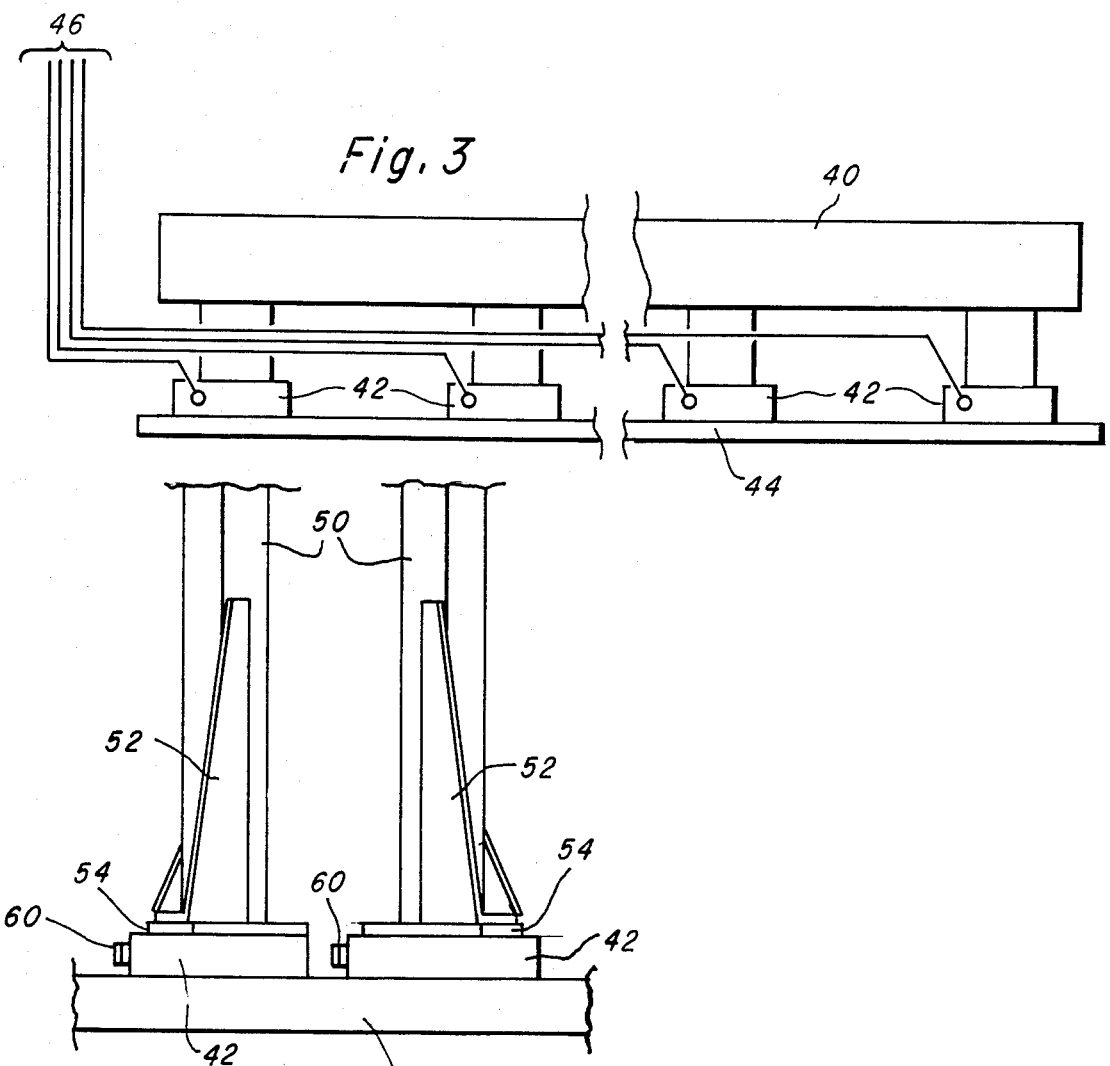
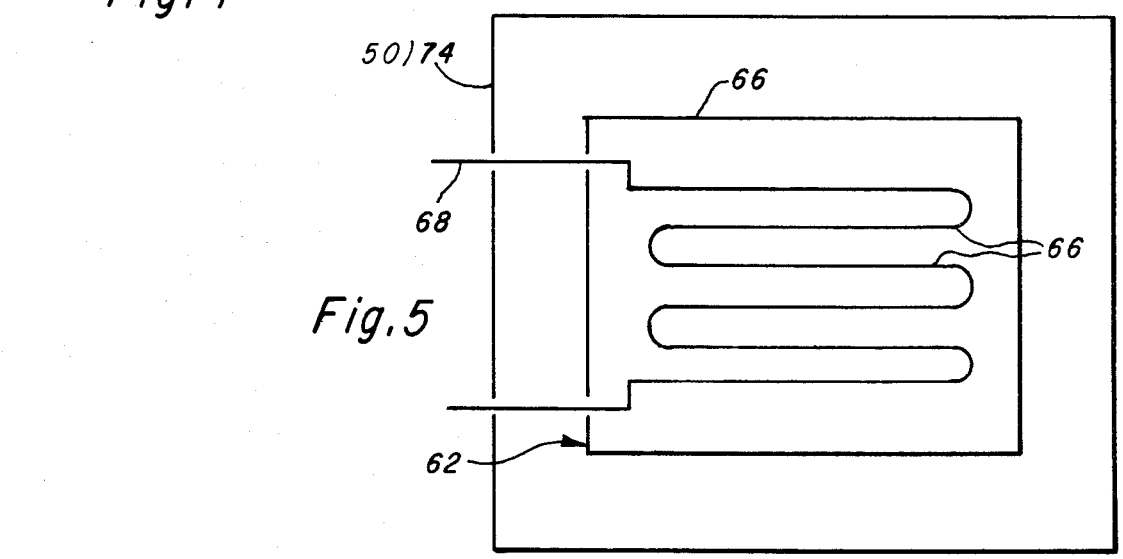

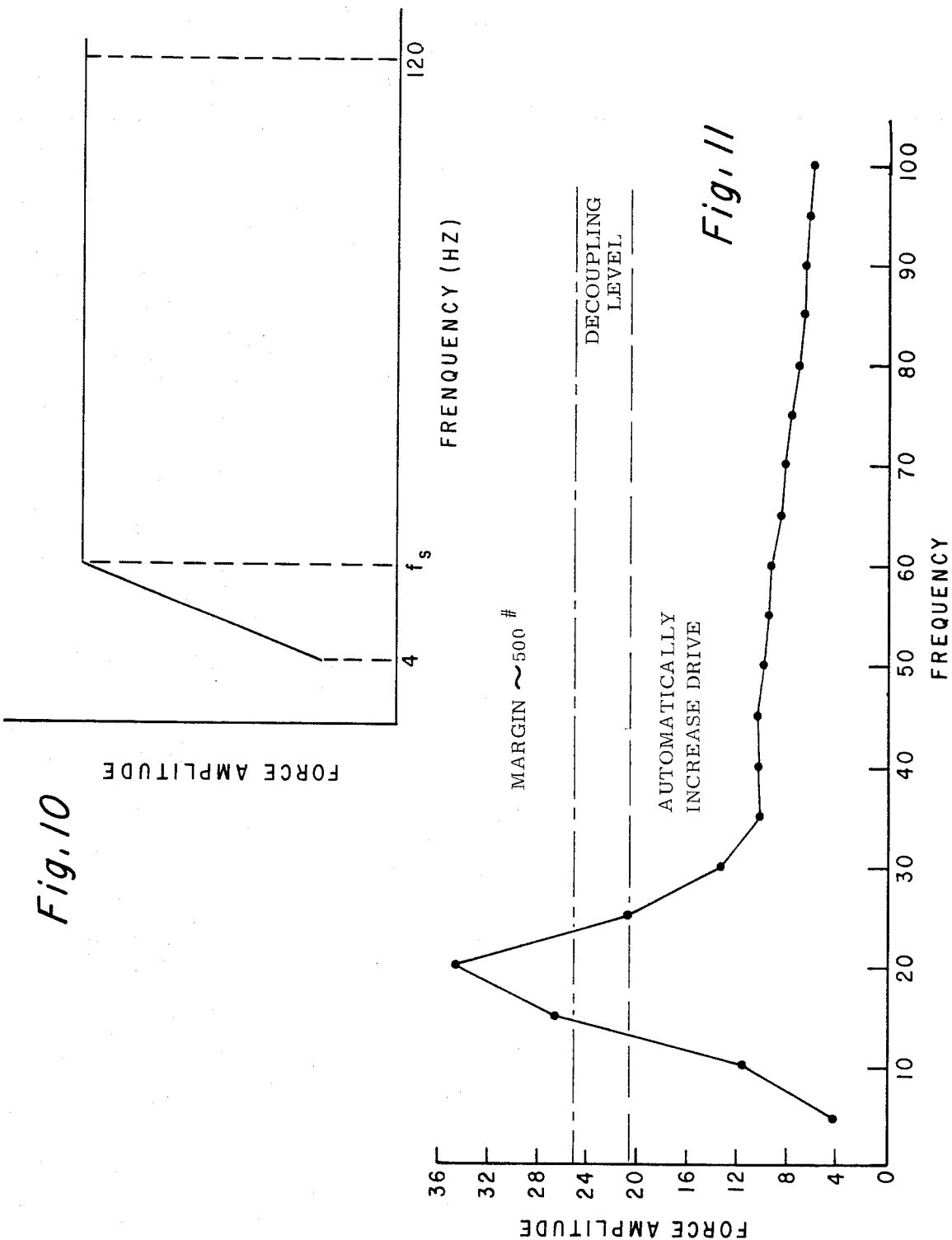

FORCE OR PRESSURE FEEDBACK CONTROL FOR SEISMIC VIBRATORS

This application is a continuation, of application Ser. No. 325,618, filed Nov. 27, 1981 now abandoned, which is a continuation, of application Ser. No. 870,236, filed Jan. 17, 1978, now abandoned, which is a continuation of application Ser. No. 673,854, filed Apr. 5, 1976, now abandoned, which is itself a continuation of application Ser. No. 427,899, filed Dec. 26, 1973, now abandoned.

This invention relates to sources of seismic energy for seismographic surveying vibrators, and more particularly to a seismic vibrator source in which the dynamic force imparted to the earth by the vibrator is measured and incorporated in a feedback system to control the vibrator source.

In the past seismic vibrator sources of the hydraulic type have included: a ground pad or plate; a hydraulic actuator; and a control means. The ground pad is a thick metal plate which can be held in contact with the ground by partially weighting with the seismic vibrator transport. The ground pad is vibrated by a hydraulic actuator to impart acoustical energy into the earth below. The hydraulic actuator includes a cylinder supporting a reaction mass. A piston is mounted in the cylinder and a piston rod connects the piston to the ground pad. The cylinder is actuated by a hydraulic system providing hydraulic fluid to the hydraulic actuator. The hydraulic system includes a pump for pumping hydraulic fluid from a reservoir thereof under high pressure to an accumulator and manifold for a servovalve. The servovalve controls the admission of hydraulic fluid into the cylinder. The servovalve includes a torque motor, one or more valve stages and a main spool or power stage. The torque motor controls the main spool or power stage. The main spool controls the flow of hydraulic fluid into the actuator cylinder alternately above and below the piston for imparting movement to the cylinder and mass of the hydraulic actuator, and out of the actuator cylinder for return through a low pressure line to the reservoir. The control means provides electrical signals to the torque motor of the servovalve which controls the main spool thereof to produce a desired frequency sweep which may be, for example, between about 4 and 120 cps.

The electrical signals of the control means are derived from a pilot signal source which produces a desired control signal that varies as a function of time. The pilot signal must be corrected because the velocity of the fluid through the main spool of the servovalve changes as a function of frequency due to the impedance of the valve and this changes the velocity of the hydraulic actuator. To correct the pilot signal, a displacement transducer such as a linear variable-differential transducer has been attached to the main spool. As the main spool displacement transducer detects an unwanted variation in frequency, its output signal varies and the control system regulates the input signal to the torque motor to bring the velocity of the main spool back to the desired value as determined by the pilot signal. A typical seismic transducer or vibrator source is that disclosed in U.S. Pat. No. 3,306,391 issued Feb. 28, 1967.

A problem with existing seismic vibrators is that impending decoupling of the ground pad from the earth's surface cannot be detected by the displacement transducers or accelerometers used in prior devices. The hold down force required to prevent decoupling depends on the soil conditions and the amplitude of the force generated by the seismic vibrator. As the hold down force is constant, the maximum allowable amplitude of the force generated by the seismic vibrator is established by the soil conditions. By measuring the force imparted to the ground, impending decoupling can be detected, and the amplitude of the force generated by the seismic vibrator controlled to prevent decoupling. In this manner the seismic vibrator can be operated at it maximum force amplitude consistent with soil conditions without decoupling.

Accordingly, it is an object of the present invention to provide an improved seismic vibrator source for use in seismic surveys.

Still another object of the invention is to provide a seismic vibrator source with force control to automatically adjust the drive level to compensate for changes in ground conditions.

Yet another object of the invention is to provide a seismic vibrator source with force control to produce a force approaching that of the ideal flat curve indicative of maximum force level.

A still further object of the invention is to provide a seismic vibrator source capable of working at its peak capability to generate the maximum possible seismic energy without decoupling.

Briefly stated, the invention comprises a seismic vibrator source which utilizes force or pressure feedback signals, generated by force sensors as force comparison signals. The force or pressure feedback signal is used to measure the force input to the earth and to provide information to control force output to prevent decoupling of the vibrator ground pad from the earth. The measurement signal is used to adjust the drive level of the seismic vibrator source to achieve the highest possible force level without ground pad decoupling. Seismic vibrator sources are designed specifically to put out a constant force over the frequency range of interest. The magnitude of this force output is much larger than the extraneous force caused by engine vibration and the like. Thus, a larger signal-to-noise ratio is possible with a force feedback signal than with an accelerometer feedback signal because of its low output at low frequencies (there is a 12 db per octave increase in output over the frequency range of the accelerometer). For decoupling determinations the force condition for decoupling is the zero force applied to the earth during decoupling. Thus, force sensors such as, for example, load cells, pressure transducers, or strain gauges are used to measure the force applied to the earth. When the minimum measured force reaches a preset minimal value, the vibrator source drive level is automatically and continuously adjusted to maintain the minimum force at the desired value.

The novel features characteristic of the embodiments of the invention may best be understood by reference to the following detailed description when read in conjunction with the accompanying drawings wherein:

FIG. 3 is a schematic of a first embodiment of the invention;

FIG. 4 is a schematic of a second embodiment of the invention;

FIG. 5 is a schematic of a third embodiment of the invention;

FIG. 10 is the ideal or theoretical force output of a seismic vibrator source; and FIG. 11 is the actual force output of a seismic vibrator source.

Figure 1:
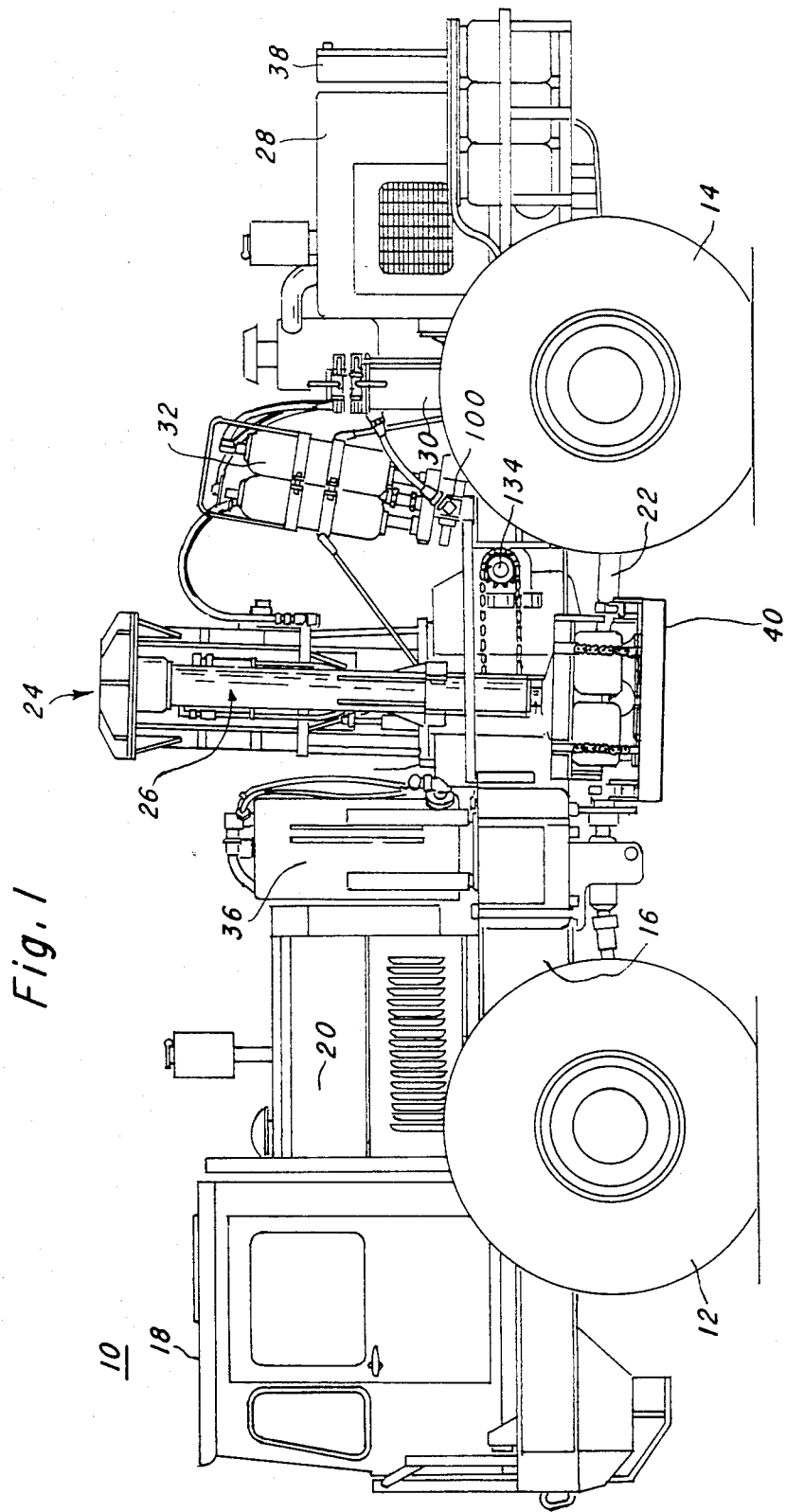
FIG. 1 is a side view of a buggy mounted hydraulic vibrator source.

Referring to the drawings, a seismic vibrator source of acoustical energy (FIG. 1) includes a typical buggy mounted hydraulic type seismic vibrator source as shown and described in copending application Ser. No. 355,838 filed Apr. 30, 1973, to which reference may be had for a more detailed description. As the buggy mounted hydraulic type seismic vibrator is described, descriptions of the embodiments of the inventions will be inserted at the appropriate points. As shown in FIG. 1, a vehicle 10 having front and rear wheels 12 and 14, respectively, support a chassis comprised of frame channels 16, a cab 18, and an engine 20. The engine 20 is connected to drive the rear wheels 14 by a drive train including drive shaft 22. The seismic transducer or vibrator source 24 is disposed between the front and rear wheels 12 and 14 and connected to the frame members 16 of the truck by a hydraulic lift system 26. The hydraulic system for the seismic vibrator includes the prime mover or engine 28, main hydraulic pump 30, high pressure accumulator system 32, low pressure accumulator system (not shown but located behind the high pressure accumulator system), hydraulic fluid tank 36, hydraulic fluid cooler 38, and associated hydraulic plumbing. The hydraulic system may be located on the frame members 16 of the vehicle 10 as shown in FIG. 1.

The transducer or vibrator source 24 (FIG. 2) includes a base plate or ground pad 40 which may be fabricated in any suitable manner to provide a flat lower base plate surface. Referring to FIG. 3 for a first embodiment of the invention, a plurality of load cells 42 are attached beneath the base plate 40 to measure the force imparted to the earth by the seismic vibrator source. The load cells 42 are preferably symmetrically spaced on the base plate, but may be in any pattern to detect the average dynamic force imparted to the earth by the vibrator through the base plate 40. A plate 44, preferably of steel, is attached to the lower ends of the load cells 42 for engaging the surface of the ground to distribute the force imparted to the earth by the vibrator and to assist the load cells in measuring the average force. It is desirable to make the plate 44 as thin as possible to reduce the mass (M) in the applicable force measuring formula $F=MA$, where A is the acceleration of the mass. Although the force output can be adjusted for any mass, the adjustment becomes more complicated with increasing mass. The load cells 42 may be any designed for compression use such as Transducers, Inc., Series No. 92, which are available in capacities ranging from 5,000 pounds through 250,000 pounds. Typically the load cell consists of a compression bar made of steel to which a plurality of strain gauges are attached or cemented by a suitable adhesive such as an epoxy. The strain gauges are attached to the compression bar in a spaced relationship one to another with the minimum number being four strain gauges spaced 90° one from another and protected by a suitable housing. It will be understood that a number of types of force or pressure sensing devices such as, for example, strain gage bridges and piezoelectric crystals, are commercially available and well suited to the practice of the invention. The outputs of the load cells are collected by conductors 46 leading to the vibrator source controller hereinafter described.

A vibrator frame 48 (FIG. 2), comprising four vertically disposed frame members 50, extends upwardly from the base plate 40 to a point well above the vehicle drive shaft 22 (FIG. 1). The lower halves of the four frame members 50 (FIG. 2) are reinforced by gusset plates 52. Bottom foot plates 54 are connected to the four vertical members of the frame 48 and the frame is bolted or otherwise attached to the base plate or ground pad 40. Top plates 56 are connected to the tops of frame members 50 and are braced by gusset plates 58.

Figure 2:
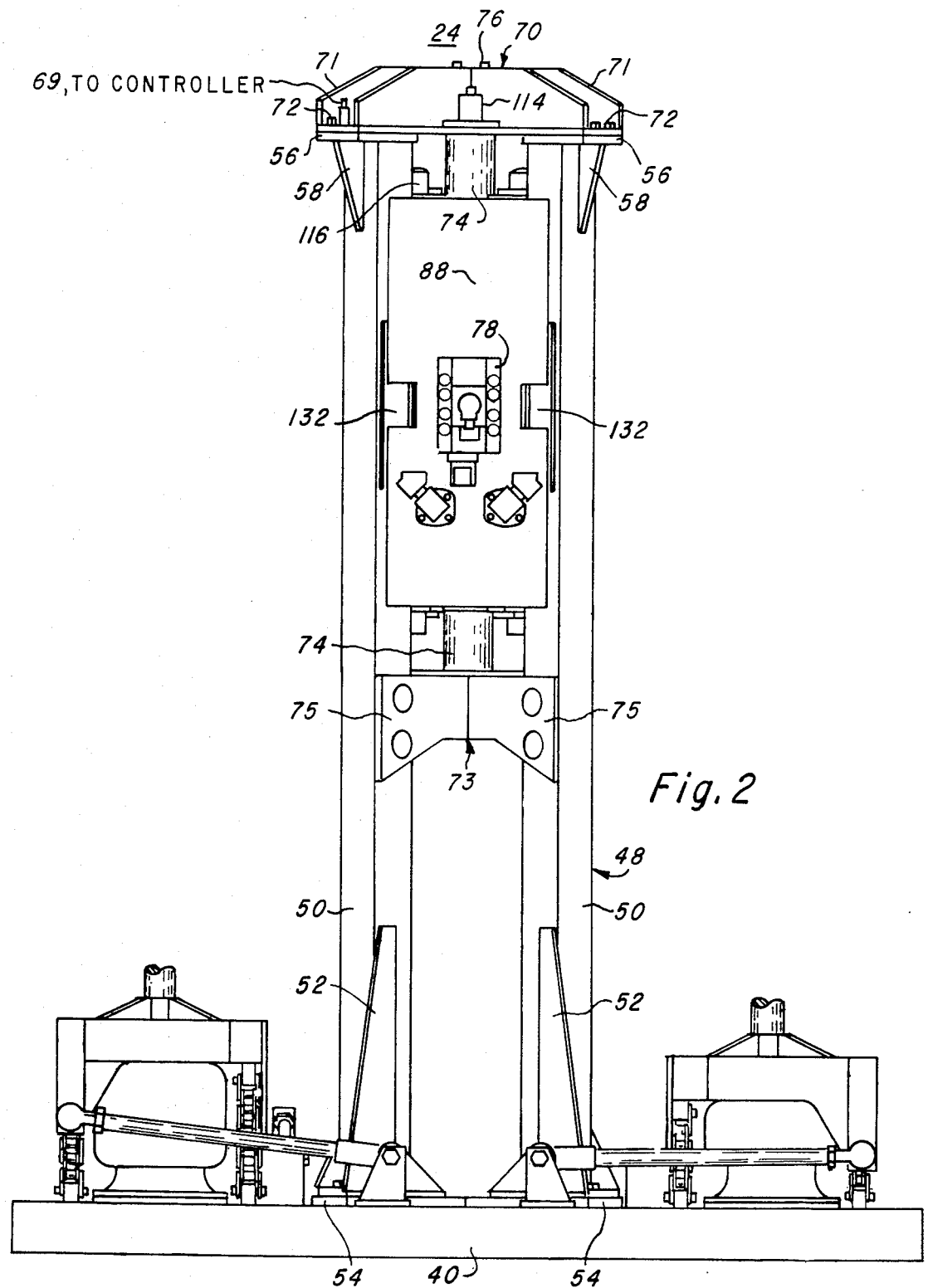
FIG. 2 is an end view of the hydraulic vibrator source showing in greater detail the buggy mounted hydraulic vibrator source of FIG. 1.

Referring to FIG. 4 for a second embodiment of the invention, load cells 42, such as those previously described, are attached between the bottom plates 54 of the four vertically disposed frame members 50 and the ground pad 40. These load cells 42 replace the load cells of the first embodiment of FIG. 3 and the ground plate 40 is constructed as shown in FIGS. 1 and 2. In this second embodiment a single load cell 42 is used with each of the four frame members in the manner described. The housing of each of the load cells 42 is modified to accommodate bolts attaching the baseplates 54 as well as the load cell to the base pad 40. It will be understood that the load cell measurements must be adjusted to compensate for the attachment force. The electrical outputs of the load cells 42 are collected through leads 60 for the vibrator source controller hereinafter described.

Referring to FIG. 5 for a third embodiment of the of the invention in which the load cells 42 of the second embodiment (FIG. 4) are replaced by resistance strain gauges 62. Preferably four equally spaced strain gauges 62 are cemented, by a suitable adhesive such as an epoxy, directly to each of the four frame members 50. Typical strain gauges 62 suitable for this purpose are transducer type strain gauges in which fine resistance wire 64 is fixed to support member 66. The support member 66 is attached to the member whose displacement is to be sensed. A potential source (not shown) is applied through leads 68. The leads 68 also connect the strain gauges to the controller. The electrical resistance of the strain gauge varies in proportion to the strain imposed on the support members by the vibrator source to vary accordingly the applied electrical current.

An upper cross member 70 (FIG. 2) is formed by intersecting channels 71. The outer ends of the channels 71 are bolted to their respective top plates 56 by bolts 72. As a fourth embodiment of the invention, at least one of the bolts 72 may be a strain gauge bolt for measuring the force input to the earth. Lead 69 connects the output of the strain gauge bolt to the controller. A lower cross member 73 is constructed similarly to the upper cross member 70 in that it comprises intersecting channel members 75 having their outer ends welded to points intermediate the four transducer frame forming vertical members 50. The intersection of the upper cross members 71 is adapted to receive the upper end of a double rod-end piston member 72. The upper end of the rod of the double rod-end piston member 74 is securely connected to the intersection of the cross member 70 by a plurality of bolts or screws 76.

Figure 6:
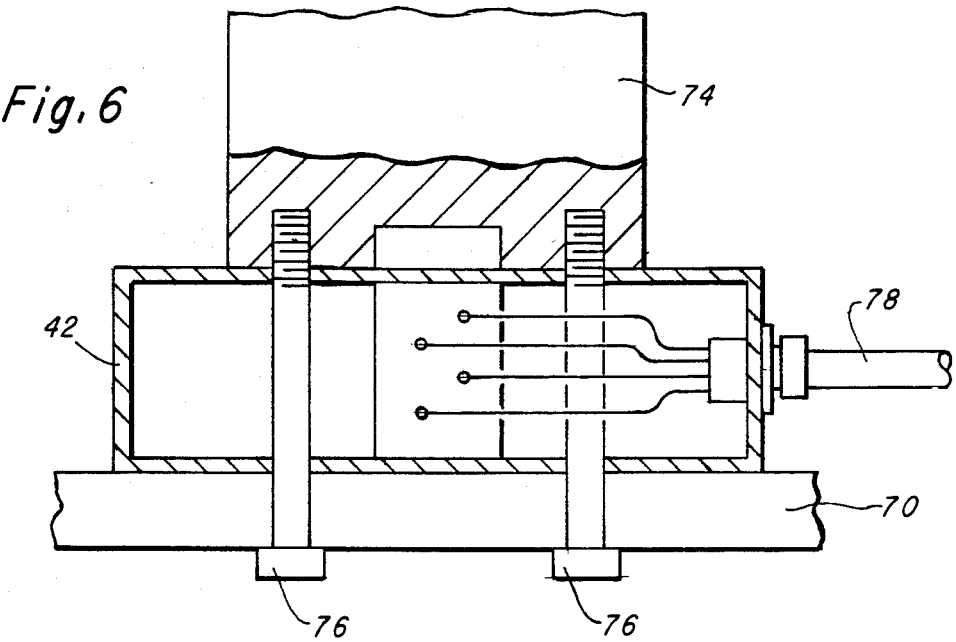
FIG. 6 is a schematic of a fifth embodiment of the invention.

Referring to FIG. 6 for a fifth embodiment of the invention in which a single load cell 42 is used. The plurality of load cells used in the first and second embodiments of FIGS. 3 and 4, the strain gauge bolt of FIG. 2, and the strain gauges of FIG. 5 are of course eliminated in this embodiment. The load cell 42 is positioned intermediate the lower end of the rod of the double rod-end piston member 74 and the lower cross member 73. In this embodiment the housing of the load cell 42 is modified to accommodate the bolts connecting the piston rod to the lower cross member 73. Leads 78 conduct the load cell outputs to the seismic vibrator controller hereinafter described.

In a sixth embodiment of this invention, a plurality of spaced resistive strain gauges 62, described in connection with FIG. 5, are cemented by a suitable adhesive, such as an epoxy, to the rod of the double rod-end piston member 74. The output of the strain gauges 62 is conducted through lead wires 63 to the electronic controller hereinafter described.

Figure 7:
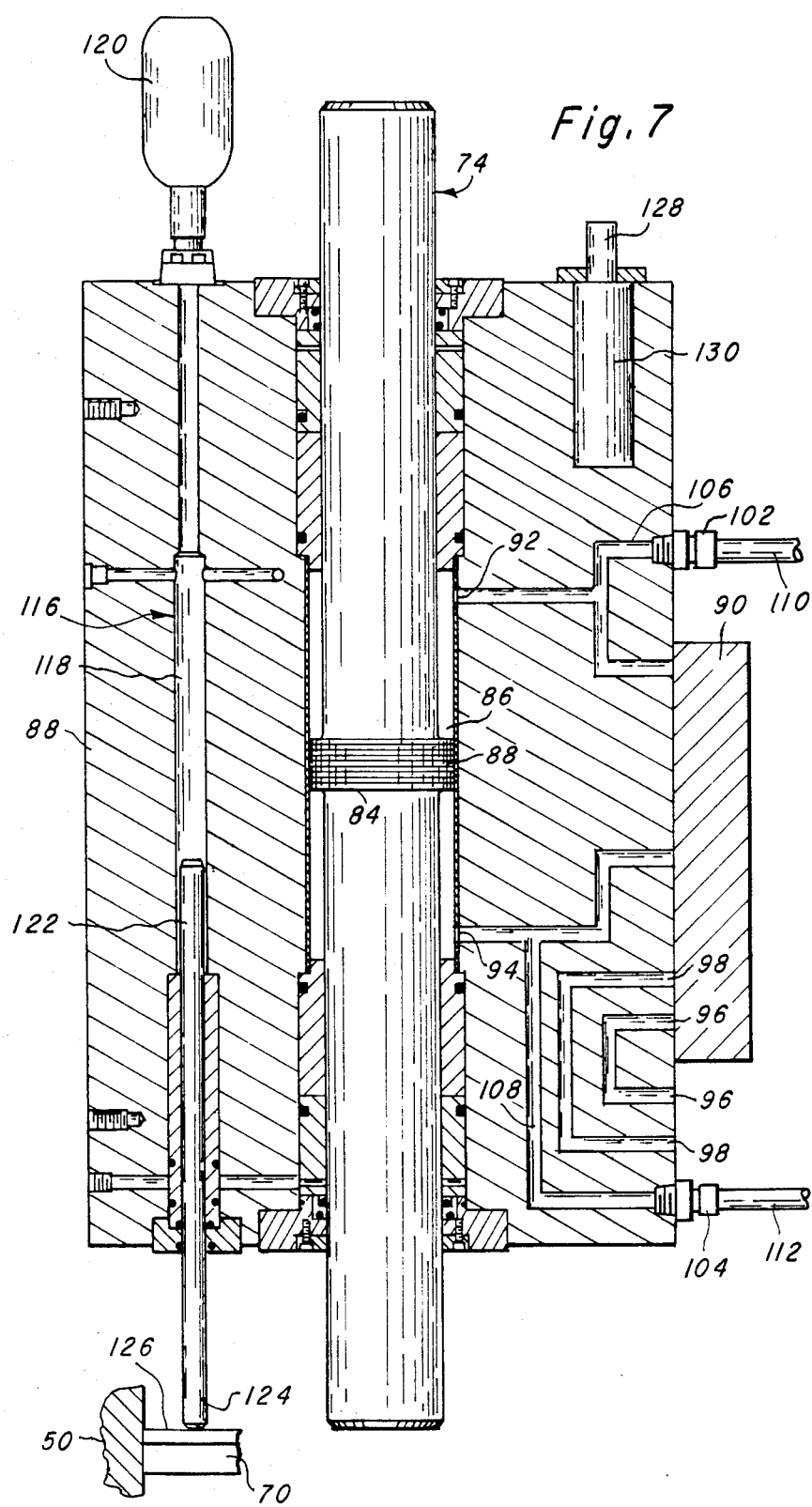
FIG. 7 is a schematic of a sixth embodiment of the invention.

The double rod-end piston member 74 has a piston 84 (FIG. 7) within a cylinder 86 formed within a reaction mass 88. Piston member 84 is provided with conventional piston rings for insuring a sliding, fluid type seal with the interior of the cylinder 86. Hydraulic fluid is introduced into the cylinder 86 alternately on opposite sides of the piston member 84 from a manifold control means such as, for example, a standard four port servo control valve 90 directing high pressure oil alternately through upper and lower hydraulic ports 92 and 94. High pressure oil is supplied to the servovalve through a high pressure passage 96 and low pressure oil flows from the servovalve through passage 98. Passages 96 and 98 are connected by hoses to a manifold 100 (FIG. 1) external to reaction mass 88 (FIG. 7). Thus, it will be evident that as hydraulic fluid is introduced through the lower port 94 into the cylinder 86 below the piston 84 the reaction mass 88 is driven downwardly relative to the piston 84, and therefor relative to ground pad 40. Conversely, when hydraulic fluid is introduced through the upper port 92 into the cylinder above the piston 84 the reaction mass 88 will be driven upwardly. As the reaction mass 88 is driven downwardly, an upwardly directed reaction force is applied to the ground pad 40 and when reaction mass 88 is driven upwardly, a downwardly directed reaction force will be applied to the ground pad 40. The amount of hydraulic fluid introduced into the cylinder 86 is controlled to vibrate the reaction mass 88 to produce varying frequencies of a given frequency range of a sweep.

Referring to FIG. 7 for a sixth embodiment of the invention which utilizes the measurements of the hydraulic pressure in the cylinder. The dynamic force imparted to the earth by the vibrator is measured by pressure transducers 102 and 104 inserted in the ends of channels 106 and 108, respectively, in communication with the fluid under pressure in the cylinder above and below the piston member through ports 92 and 94. The pressure transducers 102 and 104 may be any commercially available type such as, for example, the piezoelectric element type. The outputs, which are electrical representations of the cylinder pressure, are fed through leads 110 and 112 to the seismic vibrator controller, hereinafter described.

In normal operation of the siesmic source, the reciprocation of the reaction mass 88 (FIG. 2) is maintained centered between the upper and lower cross members 70 and 73 by means of a linear variable-differential transducer (LVDT) 114 having its electrical coils (not shown) mounted in a well provided heretofor in the reaction mass 88. These coils surround the core member (not shown) which is attached to the lower cross member 73. The electrical output of the LVDT 114 is coupled to the seismic vibrator controller, hereinafter described. Additional reaction mass support is provided by a pair of strut type arrangement 116 mounted in the reaction mass 88. Each strut arrangement (FIG. 7) includes a cylinder 118 having its upper end connected to a hydropneumatic accumulator 120 such as, for example, Greer Hydrualics Incorporated, Model No. A108-200. The accumulator is pressurized with a suitable gas such as nitrogen to a pressure of 1500 psi. A rod type piston 122 having a bearing end 124 in engagement with a stop plate 126 attached to the lower cross member 70 is mounted in the cylinder 116. The volume of the cylinder 116 above the rod type piston 122 and the oil volume of the accumulator is filled with oil and connected by a passage (not shown) to the high pressure passage 96. A substantially constant force occurs to aid in centering the reaction mass about the vibrator piston 84. Nevertheless, to guard against the eventuality that the reaction mass member 88 might become uncentered and strike either the upper or lower cross members, bumper studs 128 of a pair of shock absorbers 130 (only one of which is shown) extend outwardly from each of the upper and lower faces of the reaction mass 88 to engage the upper and lower cross members 70 and 73 to cushion and dissipate any striking force of the reaction mass 88.

To prevent the reaction mass 88 from rotating around the piston member 74, two anti-rotation plates 132 (FIG. 2) are attached to two of the transducer frame members 50 which upon rotation of the reaction mass 88 engage the edges of the reaction mass 88. The transducer frame members 50 and anti-rotation plate 132 thus act as rotation stop members for the reaction mass 88.

A synchronized hydraulic lift system 26 (FIG. 1) interconnects the seismic vibrator to the vehicle frame member 16. A mechanical synchronizing system 134 is used to synchronize the operation of the hydraulic lift system. The preferred hydraulic lift system 26 and the mechanical synchronizing system is described in detail in the above-mentioned patent application, Ser. No. 355,838, filed Apr. 30, 1973.

The hydraulic seismic vibrator 24 and hydraulic lifts are provided hydraulic fluid by a hydraulic system also shown and described in detail in the aforementioned patent application, Ser. No. 355,838, filed Apr. 30, 1973. The hydraulic system includes the tank 36 supplying oil to a prime pump (not shown). The prime pump pumps oil into a low pressure system until the low pressure system is filled and under a pressure of approximately 150 psi. With the pressure in the low pressure line at 150 psi, the main pump driver or engine 28 is started and the prime pump is shut off. Engine 28 drives a charge pump (not shown) to maintain the pressure in the low pressure system at about 150 psi. The oil pumped by the charge pump makes up any internal leakage in the system and the remainder is dumped through the case of a main pump 30 back to tank 36 thus affording cooling for pump 30. The speed of engine 28 is then increased and the pump displacement control of the main pump 30 moved to the open position thereby permitting the main pump 30 to pump oil from the low pressure system into the high pressure system. The pump displacement control is provided with the pressure override control which is set for 3,000 psi pump pressure to maintain pressure within the high pressure system at 3,000 psi. If the pressure within the low pressure ever falls below 100 psi, a pressure switch which is set at 100 psi is activated to shut down the main pump engine 28. The pressure of the high pressure system is measured at the main pump output by a guage mounted in the panel of vehicle cab 18.

Figure 8:
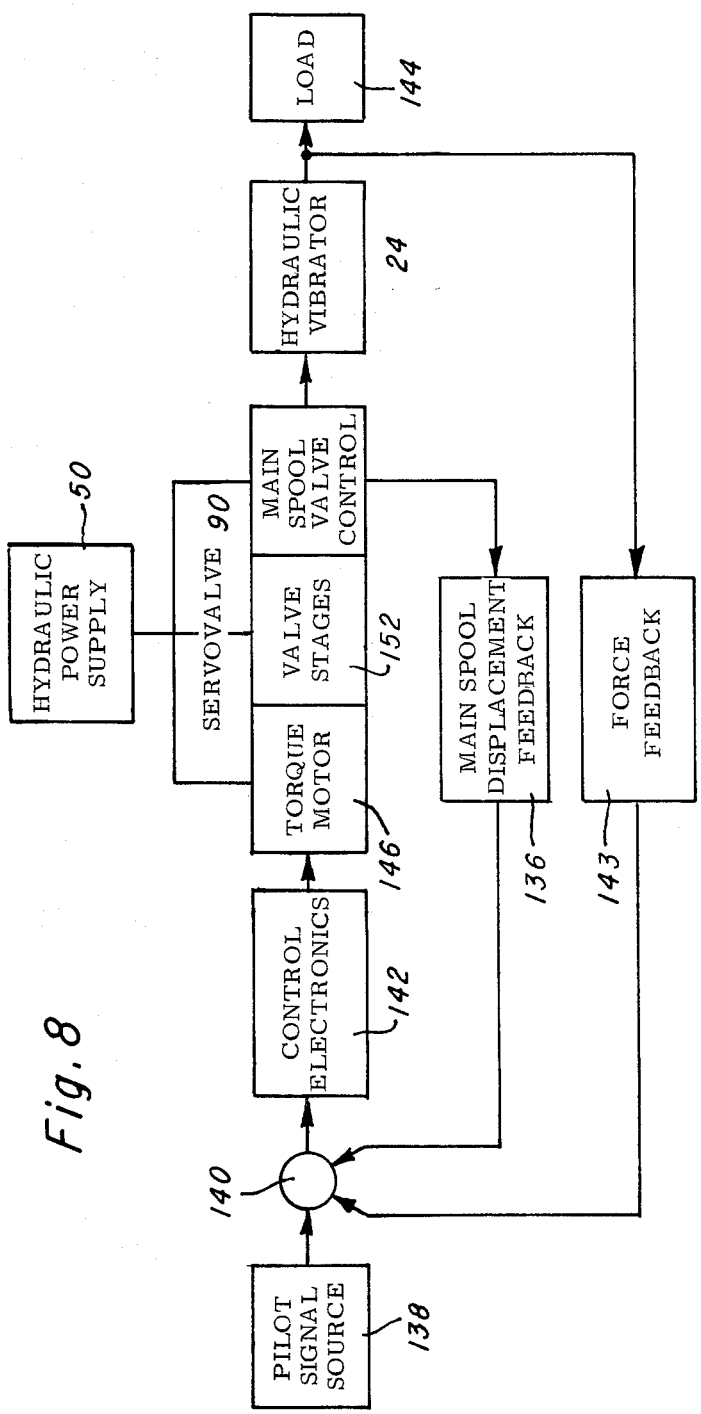
FIG. 8 is a block diagram of the hydraulic control system.

The low pressure system has as its inlet from a manifold 100 the low pressure port 98 of the servovalve 90 (FIG. 7). The high pressure side of the manifold 100 is coupled to the high pressure accumulator system 32 and to the high pressure port 96 of servovalve 90 which controls injection of the high pressure fluid into the vibrator cylinder 86. Thus, as shown in FIG. 8 the hydraulic power supply system 150 furnishes and receives hydraulic fluid from the servovalve 90. The servovalve 90 has the three major components of any servovalve: a valve stage, a slidable spool controlling the valve output, and a torque motor 146 operating the slidable spool. The servovalve found most suitable for seismic sources has three valve stages 152. The first valve stage includes a flapper valve whose hydraulic output is into the second valve stage. The second valve stage hydraulic output is into the third valve stage; the second and third valve stages are controlled by the flapper valve actuated by the torque motor 146. The three valve stages are used to alleviate the high pressure effects on the servovalve. The slidable spool member for the third stage reciprocates responsively to the torque motor to alternately open and close the channels 92 and 94 (FIG. 9) leading to the upper and lower portions of the vibrator cylinder 86 to alternately introduce hydraulic fluid under pressure from the high pressure system while closing and opening alternately the upper and lower portions of the vibrator cylinder 86, to return the hydraulic fluid to the low pressure system. The spool of the third valve stage is coupled to a linear variable differential transducer 136 whose output is a measure of the valve action. The output is fed back to the electronic controller.

The controller 142 for the seismic vibrator source is shown in FIG. 8 and constitues a servomechanism. A suitable controller unit is, for example, Texas instruments Incorporated Controller Part No. 139,066-2 which includes a function generator as a pilot signal source 138. The pilot signal source provides desired sweep control signals that vary as a function of time to drive the seismic vibrator 24 at a given amplitude for generation of a seismic signal into the earth. The pilot signal source 138 is connected to a comparator 140 and control electronics 142. The comparator 140 and control electronics 142 are shown separately to facilitate description of the system. The comparator compares the pilot signal with the force feedback signal produced by any one of the above described embodiments of the invention, which is designated in FIG. 8 as force feedback 143 derived from the load 144 (ground pad plus mechanical impedance of ground) and the mainspool displacement feedback produced by the linear variable-differential transducer shown as mainspool displacement feedback 136. The comparator 140 and control electronics 145, which also receives the output of the LVDT 114, measuring the centering of the reciprocating mass 88, produces an error signal for the torque motor 146 to correct the action of the servovalve 90.

Figure 9:
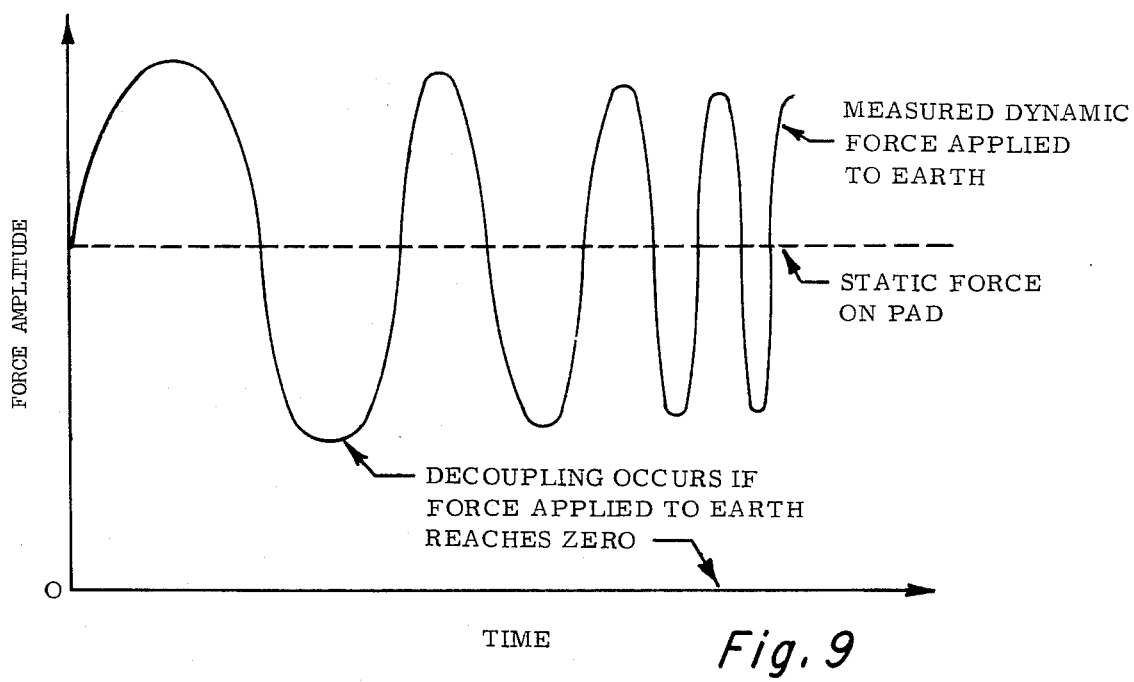
FIG. 9 is a graphic representation of the force waveform generated by a seismic vibrator source.

The measured force waveform is as shown in FIG. 9. The condition of zero force applied to the earth is the condition of decoupling. The force applied to the ground is not simply the sum of the hold down force, vibrator weight, and dynamic force capability of the hydraulic actuator; because, the dynamic behavior of the earth varies at different locations. The ideal force output is shown in FIG. 10. The force is flat above the stroke limited frequency ($f_s$). Below $f_s$ the force falls off because of the physical stroke limitation in the hydraulic cylinder. In operation the vibrator is swept over a frequency of about, for example, 4 to 120 Hz and the $f_s$ is below 5 Hz. In actual practice the force curve is not at all flat, but appears as shown in FIG. 11. The peak at 20 Hz is caused by resonance of the earth/vibrator system. The location of the peak and its sharpness are variable depending on ground conditions. If the drive signal to the vibrator is set so as to not decouple at the peak, the vibrator is not putting out the maximum force it is capable of at higher frequencies. Thus, the drive level is automatically and continuously adjusted by the controller to cause the actual force curve to approach the ideal flat curve at maximum force level.

Although preferred embodiments of the present invention have been described in detail, it is to be understood that various changes, substitutions and alterations can be made therein without departing from the scope of the invention as defined by the appended claims.

What is claimed is:

1. A seismic vibrator source having a reaction mass comprising:
   (a) a vibrator means for imparting acoustic energy into the earth, including a baseplate structure for contacting the earth connected to the reaction mass;
   (b) a drive means for vibrating the vibrator means;
   (c) a force measuring transducer means integral with said vibrator means and operative responsive to the vibrator means to produce electrical signals directly representative of the force applied to the earth, the force including the weight of the reaction mass and the weight of the baseplate structure mass, to thereby accurately represent a decoupling condition for controlling the drive means; and
   (d) comparator means for comparing the electrical signals representative of the force with a predetermined representative value for maintaining the force at that corresponding to that of the predetermined representative value.

2. A seismic vibrator source according to claim 1 wherein said transducer means comprises at least one load cell measuring the force applied to the earth.

3. A seismic vibrator source according to claim 1 wherein said transducer means comprises a plurality of piezoelectric transducers.

4. A seismic vibrator source comprising:
   (a) a ground pad for imparting acoustic energy into the earth;
   (b) a hydraulic vibrator means including a support frame connected to the ground pad, a mass, a cylinder supporting said mass in the support frame, a piston dividing the cylinder into an upper chamber and a lower chamber, and a piston rod interconnecting the piston to the ground pad;
   (c) a hydraulic drive means operatively coupled to the hydraulic vibrator for reciprocating the cylinder-supported mass to vibrate the ground pad, said hydraulic drive means including a servo valve for regulating fluid into the cylinder of the hydraulic vibrator means;

(d) a force measuring transducer means integral with said vibrator means and operatively responsive to the seismic source action for producing electrical signals directly representative of the force applied to the earth, the force including the weight of the reaction mass, the weight of the ground pad mass and the weight of the support frame to thereby accurately represent a decoupling condition for controlling the drive means; and (e) controller means including a pilot signal source and a comparator for comparing the transducer means output with the output of the pilot signal source for producing a signal for controlling the hydraulic means to maintain the force applied to the earth at a value corresponding to the output of the pilot signal source.

* * * * *